(12) United States Patent
Peltonen et al.

(10) Patent No.: US 8,885,734 B2
(45) Date of Patent: Nov. 11, 2014

(54) CLOCKING SIGNAL CONTROL

(75) Inventors: Janne Peltonen, Salo (FI); Antti Rauhala, Piispanristi (FI); Mika Salmi, Turku (FI)

(73) Assignee: ST-Ericsson SA, Plan-les-Ouates (CH)

( * ) Notice: Subject to any disclaimer, the term of this patent is extended or adjusted under 35 U.S.C. 154(b) by 265 days.

(21) Appl. No.: 13/142,772

(22) PCT Filed: Dec. 22, 2009

(86) PCT No.: PCT/EP2009/067814
§ 371 (c)(1),
(2), (4) Date: Sep. 13, 2011

(87) PCT Pub. No.: WO2010/076273
PCT Pub. Date: Jul. 8, 2010

(65) Prior Publication Data
US 2011/0317776 A1  Dec. 29, 2011

(30) Foreign Application Priority Data
Dec. 30, 2008  (EP) .................................. 08254192

(51) Int. Cl.
| | |
|---|---|
| *H04L 27/00* | (2006.01) |
| *H04L 7/02* | (2006.01) |
| *G06F 1/32* | (2006.01) |
| *H04L 7/033* | (2006.01) |

(52) U.S. Cl.
CPC . *H04L 7/02* (2013.01); *H04L 7/033* (2013.01); *G06F 1/3203* (2013.01)
USPC ............ 375/259; 375/295; 375/300; 375/268

(58) Field of Classification Search
CPC .......... H04L 7/033; H04L 7/02; G06F 1/3203
USPC ................................. 375/259, 295, 300, 268
See application file for complete search history.

(56) References Cited

U.S. PATENT DOCUMENTS

| | | | | |
|---|---|---|---|---|
| 4,805,194 | A | * | 2/1989 | Wesolowski .................. 375/316 |
| 6,202,163 | B1 | * | 3/2001 | Gabzdyl et al. ............... 713/324 |

(Continued)

FOREIGN PATENT DOCUMENTS

| | | |
|---|---|---|
| EP | 0280391 A2 | 8/1988 |
| EP | 0864960 A1 | 9/1998 |

(Continued)

*Primary Examiner* — Kenneth Lam
(74) *Attorney, Agent, or Firm* — Coats & Bennett, PLLC

(57) ABSTRACT

A system (21) comprises a first circuit (23) for transmitting information to a second circuit (22). The first circuit (23) comprises a signal generator (34) arranged to generate a signal (31) for transmission to the second circuit (22). The signal (31) has a first state for causing the second circuit (22) to perform a first operation and a second state for causing the second circuit (22) to perform a second operation. The signal generator (34) comprises means to modulate the generated signal (31) during a data burst period (52) to encode data into the generated signal (31). The data burst period (52) occurs within a period in which the generated signal (31) is in the second state. The signal (31) is modulated such that the encoded data is distinguishable from the generated signal (31). In an embodiment, a data burst period (52a, 52b) comprises a plurality of data periods (54) during which the state of the signal is representative of the data encoded in the signal (31). The data periods (54) may be separated by padding periods (55) during which the signal (31) is in the second state, The data burst period may be initiated following a delay after the signal changes from being in the first state to being in the second state.

16 Claims, 3 Drawing Sheets

(56) References Cited

U.S. PATENT DOCUMENTS

| | | | |
|---|---|---|---|
| 7,236,810 B1* | 6/2007 | Underbrink et al. | 455/574 |
| 2004/0230850 A1* | 11/2004 | Baumgartner et al. | 713/320 |
| 2006/0047988 A1* | 3/2006 | Okada | 713/323 |

FOREIGN PATENT DOCUMENTS

| | | | |
|---|---|---|---|
| EP | 1819048 | A1 | 8/2007 |
| EP | 1860815 | A1 | 11/2007 |

* cited by examiner

CLOCKING SIGNAL CONTROL

The present invention relates to the communication of information between sub-blocks of a system, for example information relating to the control of clocking signals in a wireless cellular system.

Many systems, such as wireless cellular systems, typically comprise several logical and physical sub-blocks. These sub-blocks can be, for example, ASIC (Application Specific Integrated Circuit) units forming the total working system. Each ASIC performs a specific function within the system and provides the best and most natural environment for the set of related logical operations required to perform that function. For example, the functions relating to power management (PM) may be provided by one ASIC while the functions relating to RF (Radio-Frequency) processing may be provided in another separate ASIC. Due to the modular nature of this type of arrangement, it is necessary that information can be effectively communicated between the ASIC units. Information is typically transmitted between ASICs on digital lines which terminate at the ASICs by means of electrical connection pins or pads. Typically, the number of pins or pads in an ASIC is limited and each pin is pre-allocated to a specific function.

One kind of information that needs to be communicated between ASICs relates to the control of clocking signals. One of the typical functions of a PM ASIC is to control entry into and exit from 'sleep mode' in which clocking signals normally provided to the various parts of the system are temporarily switched off in order to conserve power. However, in wireless cellular systems, clock generation and clocking functions (including operations to actually perform entry into, and exit from, sleep mode) are typically performed inside the RF ASIC. For this reason, in order for the PM ASIC to control entry into and exit from sleep mode, by instructing the RF ASIC to do so, it is necessary for the PM ASIC to communicate with the RF ASIC.

In order to instruct the RF ASIC to enter and exit sleep mode, the PM ASIC typically transmits a two-state signal on a single digital line to the RF ASIC, which has a pin dedicated to receiving the signal. The state of the signal depends on the detection by the PM ASIC of one or more clock request signals which are asserted by various components of the system when clocking signals are required. If no clock request signals are asserted then the system is considered to be inactive in which case the sleep mode is entered to conserve power. The signal transmitted from the PM ASIC to the RF ASIC is placed in a first (e.g. low) state causing the RF ASIC to not provide clocking signals to the various components of the system. When at least one clock request signal is subsequently asserted by at least one of the components, sleep mode is exited from. The transmitted signal is placed in a second (e.g. high) state causing the RF ASIC to provide clocking signals to each of the components.

As systems are becoming more complex, and in order to form adaptive and dynamically optimised systems, it is often necessary to communicate additional information between ASICs. However, it is usually not possible to add pins to accommodate the additional digital lines required to transmit this information due to limited physical size of the ASICs.

In accordance with one aspect of the invention, there is provided a first circuit for transmitting information to a second circuit, the first circuit comprising a signal generator arranged to generate a signal for transmission to the second circuit, the signal having a first state for causing the second circuit to perform a first operation and having a second state for causing the second circuit to perform a second operation; wherein the signal generator comprises means to modulate the generated signal during a data burst period to encode data into the generated signal, the data burst period occurring within a period in which the generated signal is in the second state, the signal being modulated such that the encoded data is distinguishable from the generated signal.

Embodiments of the invention will now be described, by way of example only, with reference to the Figures, in which:

FIG. 4a illustrates the SysClkReq signal used in the system shown in FIG. 3; and FIG. 4b shows a close-up view of the data burst period of the signal shown in FIG. 4a.

Figure 1:
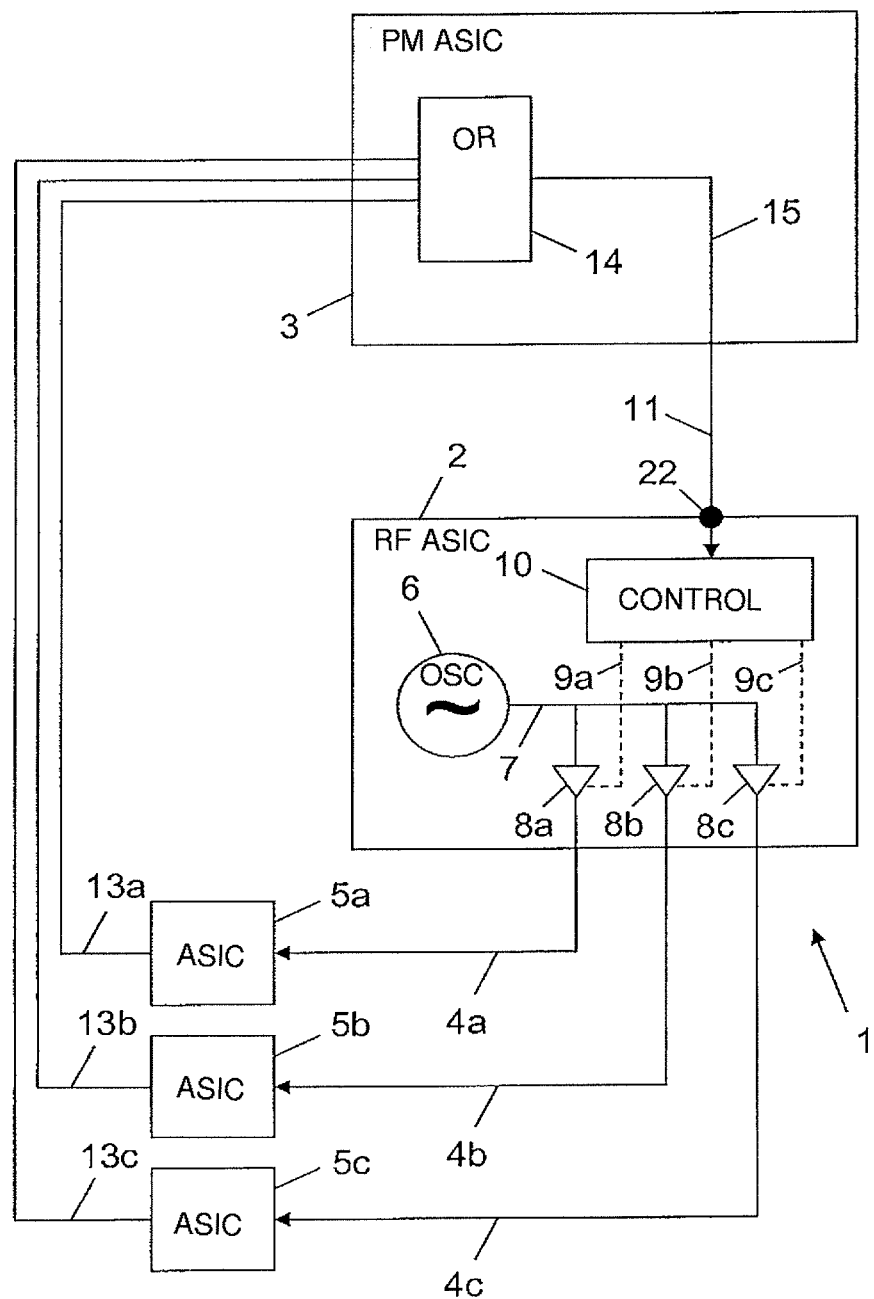
FIG. 1 is a schematic diagram of a system in which a clock enable signal is communicated between a first ASIC and a second ASIC.
Figure 2:
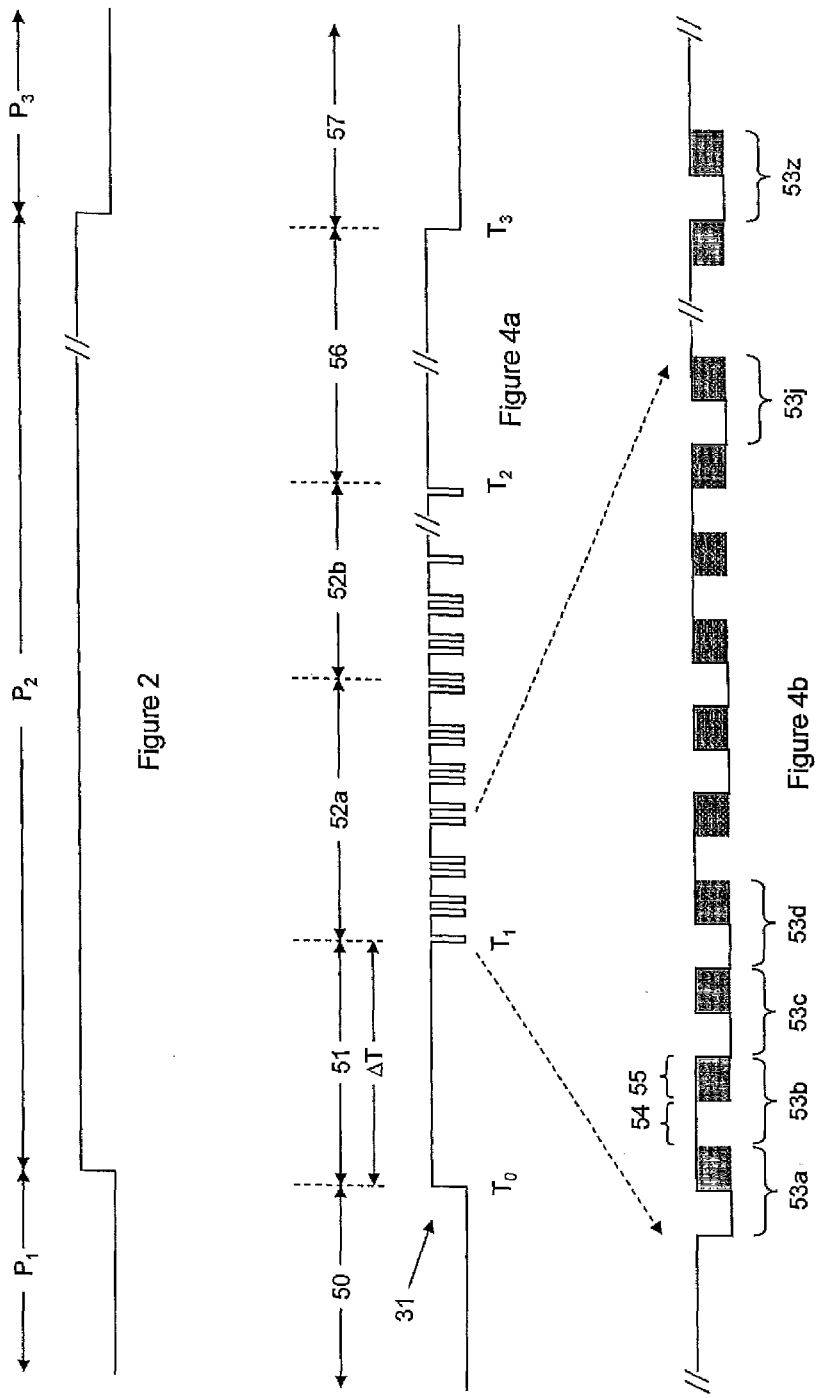
FIG. 2 illustrates the clock enable signal used in the system shown in FIG. 1.
Figure 3:
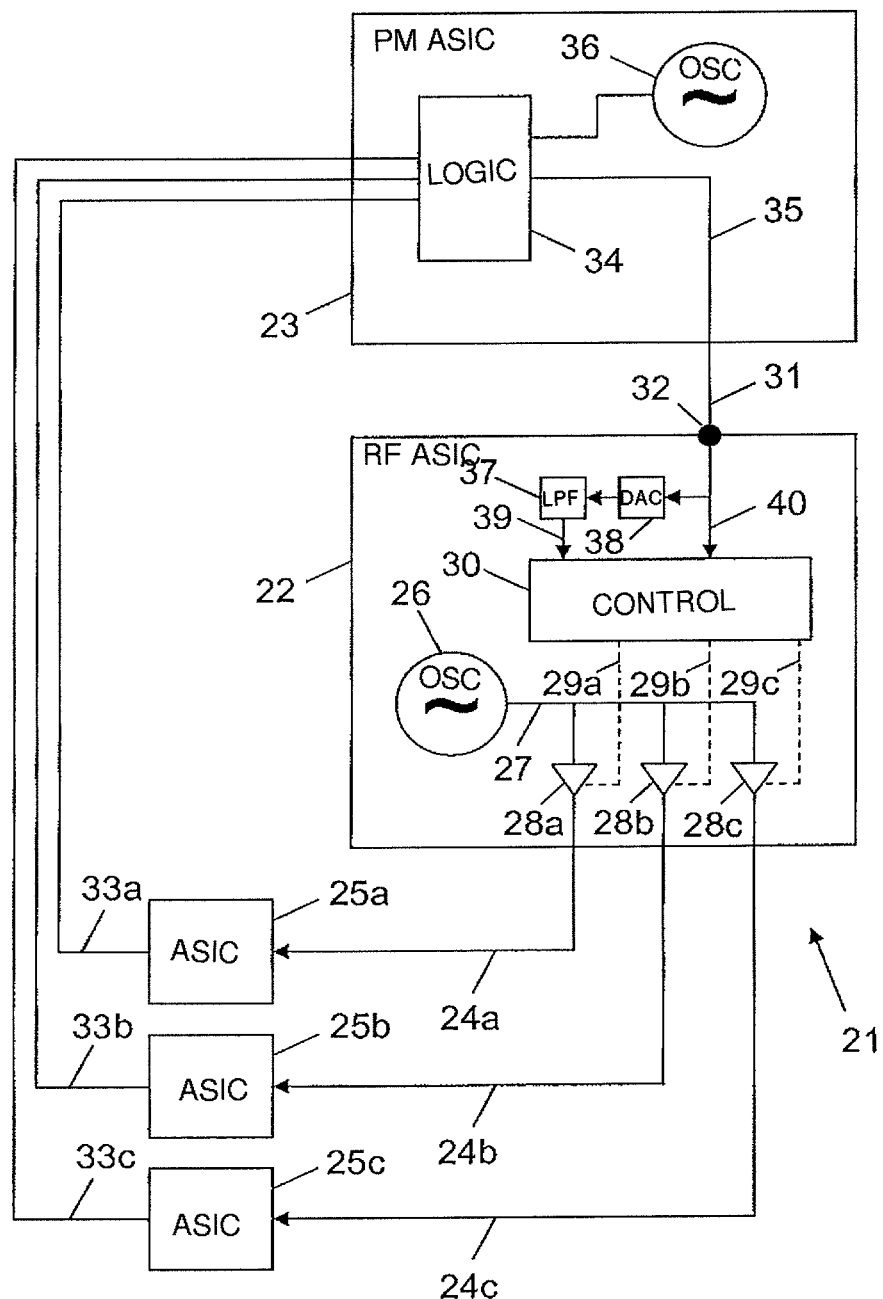
FIG. 3 is a schematic diagram of a system in which a System Clock Request signal, SysClkReq, is communicated between a first ASIC and a second ASIC.

FIG. 1 illustrates a system 1 in which a clock enable signal (illustrated in FIG. 2) is communicated between a first ASIC 2 and a second ASIC 3 in order to control clocking functions, such as controlling entry into, and exit from, sleep mode. FIG. 3 illustrates a system in which a System Clock Request signal, SysClkReq, (illustrated in FIGS. 4a and 4b) is communicated between a first ASIC 22 and a second ASIC 23. The SysClkReq signal has a form such that it can function as a clock enable signal as used in the system shown in FIG. 1. However, the SysClkReq signal also comprises a message burst allowing it to convey additional information between the ASICs, such as specific clocking information.

FIG. 1 schematically illustrates the system 1 comprising a first ASIC 2 and a second ASIC 3. In this example, the first ASIC 2 is a RF ASIC which performs clock generation and clocking functions, while the second ASIC 3 is a PM ASIC providing power management functions. One of the functions of the first ASIC 2 is to provide clocking signals 4a-c to one or more further ASICs 5a-c in the system 1. As shown in FIG. 1, a separate clocking signal 4a-c is provided for each of the respective further ASICs 5a-c. The first ASIC 2 comprises an oscillator 6 which generates a clock signal 7 which is split into multiple signals from which the clocking signals 4a-c provided to the further ASICs 5a-c are derived. In the example shown in FIG. 1, the further ASICs 5a-c are arranged in parallel. Each of the split clock signals 7 passes through a respective gate 8a-c which can selectively allow or block the signal 7 depending on respective gate control signals 9a-c. The respective gate control signals 9a-c are generated by control logic 10 thereby allowing the control logic 10, and thus the first ASIC 2, to selectively provide the respective clocking signals 4a-c to respective further ASICs 5a-c, or not.

The provision of clocking signals 4a-c to the further ASICs 5a-c requires significant power consumption. Therefore, if the system 1 becomes temporarily inactive so that none of the further ASICs 5a-c require clocking signals 4a-c, in order to conserve power, the system 1 may enter a state in which no clocking signals 4a-c are provided to any of the further ASICs 5a-c. This mode of operation is often referred to as a sleep mode. A similar low-power mode may be entered in other circumstances, for example when the power supply is running low. It can be seen that the control logic 10 may cause the system 1 to enter into, or exit from, sleep mode by "shutting" or "opening" the gates 8a-c using appropriate control signals 9a-c.

From the foregoing, it can be seen that it is a role of the first (RF) ASIC 2 to perform actual entry into and exit from sleep mode. However, since entry into sleep mode is generally a power-saving mechanism, the actual control and responsibility of whether and when to enter into, or exit from, sleep mode is typically allocated to the second (PM) ASIC 3. This means that information needs to be transmitted from the second ASIC 3 to the first ASIC 2. Specifically, in order to instruct the first ASIC 2 to enter into, or exit from, sleep mode, the second ASIC 3 outputs a signal 11, which is received by the first ASIC 2, and whose state defines whether sleep mode should be entered into or exited from. This signal is illustrated in FIG. 2. For example, when the signal 11 is not asserted, or is in a low state, the first ASIC 2 causes the system 1 to be placed or maintained in sleep mode, whereas when the signal 11 is asserted, or is in a high state, the first ASIC 2 causes the system 1 to be placed or maintained in the normal, non-sleep, mode. The first ASIC 2 comprises a contact pin 22 which is dedicated to receiving the signal 11.

In the following description, the signal 11, and any equivalent signal, which controls whether or not clocking signals 4 are provided to parts of the system 1, are referred to as clock enable signals. The clock enable signal 11 has two possible states. The first state indicates that no clocking signals 4a-c derived from a system clock, such as oscillator 6, are to be provided to any part of the system 1 (sleep mode). The second state indicates that clocking signals 4a-c are to be provided.

As mentioned above, when the further ASICs 5a-c are inactive, the system 1 may be placed in sleep mode during which time no clocking signals 4a-c are provided to the further ASICs 5a-c. However, one or more of the further ASICs 5a-c may subsequently become active and therefore require clocking signals 4a-c once again. To this end, when any of the further ASICs 5a-c require clocking signals 4a-c, the ASIC 5 requiring the clocking signals 4 asserts a respective clock request signal 13. Any clock request signals 13a-c asserted by the respective further ASICs 5a-c are received by the second ASIC 3. The second ASIC 3 is arranged to produce the clock enable signal 11 according to the respective received clock request signals 13a-c. Specifically, if the second ASIC 3 receives one or more asserted clock request signals 13a-c, the clock enable signal 11 is placed or maintained in a high state, while if no clock request signals 13a-c are asserted, the clock enable signal 11 is placed or maintained in a low state.

In the system illustrated in FIG. 1, the second ASIC 3 comprises logic 14, in the form of an OR gate, which receives each of the clock request signals 13a-c as inputs and produces an output 15 from which the clock enable signal 11 is derived. FIG. 2 illustrates the form of the clock enable signal. The output 15 of logic 14, and thus the clock enable signal 11, is high if any of the inputs are high and is low if none of the inputs are high. It can thus be seen that the clock enable signal 11 remains high while any one of the further ASICs 5a-c is asserting a clock request signal 13a-c. This is the case during the period $P_2$ illustrated in FIG. 2. During this period, the control logic 10 of the first ASIC 2 receiving the clock enable signal 11 causes clocking signals 4a-c to be provided to respective further ASICs 5a-c. Conversely, the clock enable signal 11 output by logic 14 remains low while none of the further ASICs 5a-c is asserting a clock request signal 13a-c. This is the case during the periods $P_1$ and $P_3$ illustrated in FIG. 2. During these periods, the control logic 10 causes no clocking signals 4a-c to be provided to any of the further ASICs 5a-c.

In one arrangement, the control logic 10 is arranged to react to changes in the state of the clock enable signal 11 only after a delay. For example, the control logic 10 may be arranged to initiate entry into sleep mode when the clock enable signal 11 changes from high to low only after a certain delay period and only if the clock request signal 11 has remained low for the entire delay period. This condition may be imposed to ensure that sleep mode is not entered when the system is inactive for only a short time. In such cases it may be unnecessary to enter sleep mode, and due to the time required to perform the sleep mode entry and exit procedures (which may be longer than the period of inactivity), may actually result in significant system delays. In another example, the control logic may be arranged to initiate exit from sleep mode when the clock enable signal changes from low to high only after a certain delay period. This condition may be imposed to provide sufficient time to carry out any relevant wake-up initialisation procedures before clocking signals are provided. Since the provision of clocking signals consumes power, delaying this step until the initialisation procedure is complete conserves power.

Using the system shown in FIG. 1, it is not possible for the first ASIC 2 to know which of the further ASICs 5a-c caused the sleep mode to be exited by asserting a clock request signal 13a-c. This is because the clock request signals 13a-c are combined by the logic 14 to derive the clock enable signal 11 in such a way that information regarding the origin of the clock request signals 13a-c is lost. The simple two-state clock enable signal 11 described above is insufficient to convey any additional information.

As new systems are becoming increasingly complex, some level of dynamical adaptation is desirable in order to optimise the system. In the system described above, it would be advantageous for the first ASIC 2 to know which of the further ASICs 5a-c requested clocking signals. One simple way to achieve this would be to provide additional parallel digital control lines between the first ASIC 2 and the second ASIC 3 to convey the information. Another way would be for the clock request signals 13a-c to be provided directly to the first ASIC 2. Both of these techniques require additional pins to be provided on the first ASIC 2 in order to accommodate the additional digital lines. As mentioned above, all available physical space for connection pins is typically already used for existing functions and so it may not be possible in some, but not all, situations to add pins. Furthermore, the amount of information it is desirable to transmit between ASICs is becoming larger. For example, the number of components which may independently request clocking signals is becoming larger. A large number of additional pins would therefore be required to accommodate the digital lines necessary to transmit the clocking information.

FIG. 3 illustrates a system 21 in which a SysClkReq signal 31 is transmitted to a first ASIC 22 from a second ASIC 23. As described in greater detail below, the SysClkReq signal 31, illustrated in FIGS. 4a and 4b, can be used in the same way as the clock enable signal 11 used in the system 1 illustrated in FIG. 1. However, the SysClkReq signal 31 also comprises a data burst 52 allowing it to convey additional information between the second ASIC 23 and the first ASIC 22. For example, this information may identify which further ASICs 25 in the system 21 have asserted a clock request signal 33. Since the SysClkReq signal 31 may be transmitted on a single line, no additional pins are required to transmit the additional information, or, depending on the amount of information required, the number of additional pins required may be minimised.

The system illustrated in FIG. 3 is similar to the system shown in FIG. 1 except in the way that the SysClkReq signal 31 is generated by logic 34 and used by control logic 30. The system 21 shown in FIG. 3 comprises a first ASIC 22, which in this example is a RF ASIC, and a second ASIC 23, which in this example is a PM ASIC. The first ASIC 22 outputs one or more clocking signals 24*a-c* which are provided to one or more respective further ASICS 25*a-c*. The further ASICs 25*a-c* are illustrated as being arranged in parallel although they could be arranged in any other suitable configuration. The first ASIC 22 comprises an oscillator 26 which generates a clock signal 27. The clock signal 27 is divided into separate signals which form the clocking signals 24*a-c* output by the first ASIC 22. The separate clock signals each pass through a respective gate 28*a-c* which block or allow the passage of the respective clock signals 7 according to respective control signals 29*a-c* output by the control logic 30. The control logic 30 operates in accordance with a SysClkReq signal 31 output by the second ASIC 23 and received by the first ASIC 22. The first ASIC 22 comprises a pin 32 for receiving the SysClkReq signal 31.

Each of the further ASICs 25*a-c* can request respective clocking signals 24*a-c* by outputting a respective clock request signal 33*a-c*. The second ASIC 23 comprises logic 34 which receives clock request signals 33*a-c* and generates an output 35 forming the SysClkReq signal 31.

The SysClkReq signal 31 will now be described with reference to FIGS. 4*a* and 4*b*. FIG. 4*a* schematically illustrates the form of the SysClkReq signal 31 in one exemplary embodiment. The SysClkReq signal 31 shown in FIG. 4*a* is similar to the clock enable signal 11 described above in relation to the system shown in FIG. 1, except that the SysClkReq signal 31 comprises a data burst period 52 in the middle part of the signal. FIG. 4*b* shows a close-up view of the data burst period 52 of the SysClkReq signal 31. During the data burst period 52, the clock enable component of the signal 31 is modulated to encode data into the signal 31. The signal 31 is created in such a way that the clock enable component of the signal can be distinguished from the serial data component by the control logic 30 of the first ASIC 22. This in turn enables the SysClkReq signal to function as both a clock enable signal and a data carrier.

At a time when no clock request signals 33*a-c* are being asserted, the SysClkReq signal 52 is generated in a low state, shown as period 50 on the left hand side of FIG. 4*a*. When the first ASIC 22 receives the SysClkReq signal 31 in a low state, the control logic 30 of the first ASIC 22 controls the gates 28*a-c* such that no clocking signals 24*a-c* are provided to the further ASICs 25*a-c*. In this state, the system 21 is in sleep mode.

At a time $T_0$, at least one of the further ASICs 25*a-c* requests clocking signals 24 by asserting a respective clock request signal 33. The logic 34 detects the assertion of one or more clock request signals 33*a-c* and causes the SysClkReq signal 31 to be generated in a high state, shown as period 51 in FIG. 4*a*. When the first ASIC 22 receives the SysClkReq signal 31 in a high state, the control logic 30 of the first ASIC 22 initiates a system wake-up procedure to exit sleep mode including controlling the gates 28*a-c* such that clocking signals 24 are provided to one or more of the further ASICs 25. The first rising edge of the SysClkReq signal 31 at time $T_0$ signals that the wake-up procedure should be initiated.

In one embodiment, the control logic 30 of the first ASIC 22 is arranged so that the SysClkReq signal 31 must remain in a high state for a certain time period before the wake-up procedure is initiated and one or more clocking signals 24 are provided to one or more respective further ASICs 25. As shown in FIG. 4*a*, the SysClkReq signal 31 remains in a high state for a period $\Delta T$, until a time $T_1$, at which time the message burst portion of the SysClkReq signal 31 begins. A delay between the first rise in the SysClkReq signal 31 from a low state to a high state to the beginning of the data burst may be used for several reasons. First, the delay ensures that the SysClkReq signal 31 is maintained in a high state for the time period required by the control logic 30 to initiate the wake-up procedure. Second, as described in greater detail below, the delay helps the control logic 30 to filter out, distinguish or otherwise separate the data component of the SysClkReq signal 31 for the purpose of using the SysClkReq signal 31 as a clock enable signal.

At time $T_1$, a first data burst period 52*a* begins. During this period, data bits are encoded into the SysClkReq signal 31 allowing the SysClkReq signal 31 to be used to communicate data from the second ASIC 23 to the first ASIC 22.

In particular, as best seen in FIG. 4*b*, the data burst period 52 comprises a series of data frames 53*a-z*, each data frame 53*a-z* conveying one bit of data. Each data frame 53*a-z* comprises a data period 54 in which the actual data bit is encoded, and a padding period 55 which separates consecutive data bits. The padding periods 55 are indicated in FIG. 4*b* in grey for ease of visualisation.

During the data period 54 of a data frame 53 the SysClkReq signal 31 is set to either a high or low state depending on whether the data bit to be encoded in that data frame is a logical 1 or logical 0. During the padding period 55 of the data frame 53 the SysClkReq signal 31 is set to or maintained in a high state. For example, the data frames 53*b*, 53*c* and 53*d* shown in FIG. 4*b* encode binary values 1, 0 and 0 respectively since the signal is respectively in a high, low and low state during the respective data periods 54*b*, 54*c*, 54*d*. The signal is in a high state during each of the respective padding periods 55*b*, 55*c* and 55*d*. The padding periods 55 occurring between consecutive data bits makes it possible to filter, distinguish or otherwise separate the serial data conveyed by the SysClkReq signal 31 from the clock enable component of the signal 31. As described in greater detail below, the presence of the padding periods helps the control logic 30 to filter out the data component of the SysClkReq signal 31 for the purpose of using the SysClkReq signal 31 as a dock enable signal.

In one embodiment, the data value encoded in the first data frame 53*a* of the first data burst period 52*a* is always zero. This acts as a "start" bit to indicate the start of the data burst period 52*a*. When the control logic 30 detects the start data bit, for example by detecting the first falling edge of the signal occurring after time $T_0$ (i.e. at time $T_1$), this causes the control logic 30 to begin reading data. The data is read by detecting the state of the SysClkReq signal 31 during the data period 54 of each data frame 53 (following the first one, if the first data frame 53*a* is used to indicate the start of the data burst period 52*a*).

In embodiments in which the start bit 53*a* is used to signal the beginning of the data burst period 52*a*, asynchronous timing can be used for the data burst. In an alternative embodiment, the time period $\Delta T$ between the first rising edge of the SysClkReq signal 31 (at time $T_0$) and the start of the first data burst period 52*a* (at time $T_1$) is predetermined or selected in advance. In this way, the control logic 30 can begin reading data the time period $\Delta T$ after time $T_0$. In this case, the first bit 53*a* can be used to represent data instead of indicating the start of the data burst period 52*a*.

The data period 54 and padding period 55 of each data frame 53*a-z* may last for any suitable time. For example, in one embodiment, the data period 54 and padding period 55 each last one clock cycle. In some embodiments, the duration of each padding period is greater than a certain fraction of the duration of each data period. Preferably, the duration of each padding period is at least as large as the duration of each data period. This ensures that the signal level averaged over a data burst period is greater than a threshold (even if all data bits are zero). For example, the threshold is the level such that an (analogue) signal having a level less than the threshold is considered to be in a low state while a signal having a level greater than the threshold is considered to be in a high state. In this way, an averaged signal can be used to represent a clock enable signal. Alternatively, or additionally, the timing of the data periods and padding periods may be selected so that changes in state of the SysClkReq signal 31 due to serial data is not interpreted by the first circuit 22 as changes in state of the clock enable component of the signal. For example, each data period may be shorter than the period during which the SysClkReq signal 31 must remain in a particular state, after changing from one state to another, for the first circuit 22 to regard the clock enable component to have changed state. This ensures, for example, that a zero bit of data is not interpreted by the first circuit as the clock enable component changing to a low state. In order to enable the logic 34 to apply the correct timing for generation of the SysClkReq signal 31, the second ASIC 23 comprises an oscillator 36 which provides clock signals to the logic 34.

In one embodiment, the data burst period 52a comprises a pre-determined or otherwise selected number of data frames 53a-j, such as 8 or 16. This scheme limits the number of bits of data that can be communicated in a single data burst period 52a. However, in other embodiments, the data bit encoded within the last data frame 53j of a data burst period 52a is used to indicate whether or not a further data burst 52b is to follow. For example, if the last data bit is equal to 1 (resulting from the signal being in a high state in the data period 54 of the last data frame 53j), then this signals that a further data burst period 52b will immediately follow the current one 52a. In this way a further sequence of bits may be transmitted. If the data bit encoded in the last data frame 53z of a data burst period 52b is equal to 0 then this signals that no more data is to follow. This arrangement allows an arbitrary number of data burst periods to occur thereby making it possible to relay arbitrarily large amounts of data.

Following the final data burst period 52b, at a time $T_2$, the SysClkReq signal 31 is maintained in a high state, shown as period 56 in FIG. 4a. The high state of the SysClkReq signal 31 during period 56 indicates that at least one clock request signal 33a-c is still being asserted. The control logic 30 of the first ASIC 22 therefore continues to provide clocking signals 24. In one embodiment, the data communicated to the first ASIC 22 in the SysClkReq signal 31 comprises information relating to which of the further ASICs 25a-c is requesting clocking signals 24a-c. Since the control logic 34 knows which of the clock request signals 33a-c are being asserted, the logic 34 of the second ASIC 23 can encode this information into the SysClkReq signal 31 accordingly. Using this information, the control logic 30 of the first ASIC 22 may control the gates 28a-c such that, during period 56, respective clocking signals 24 are provided only to those further ASICs 25 that are requesting them. Clocking signals 24 are not provided to the other further ASICs 25. In this way, the system 21 is dynamically configurable to enable optimisation of power consumption and performance. It is understood that other information may be communicated, such as data specifying which clocking mode to place the system 21 into.

At a time $T_3$, none of the further ASICs 25a-c require clocking signals 24 and so no clock request signals 33 are asserted. During the subsequent period in which no clocking signals 24 are provided, shown as period 57 in FIG. 4a, the system 21 is placed into sleep mode once again. At time $T_3$, the logic 34 of the second ASIC 23 detects that no clock request signals 33 are being asserted and places the SysClkReq signal 31 in a low state. When the control logic 30 receives the SysClkReq signal 31 in a low state this causes the control logic 30 to initiate the necessary procedure to enter sleep mode.

In one embodiment, the control logic 30 of the first ASIC 22 is arranged so that the SysClkReq signal 31 must remain in a low state for a certain time period before initiating entry into sleep mode. This ensures, for example, that sleep mode is not entered erroneously due to fluctuations in the SysClkReq signal 31 during the data burst periods 52a, 52b. In one embodiment, the SysClkReq signal 31 must be maintained in a low state for a period at least equal to the duration of one or more data frames 53, or at least greater than the duration of one data period, for the control logic 30 to initiate entry into sleep mode. If this condition is imposed, since the SysClkReq signal 31 goes high during each data frame 53 (at least during the padding period 55), and is not maintained in a low state for longer than one data period, it is not possible for the system 21 to enter sleep mode during a data burst period 52a, 52b. Low signal pulses during a data burst period would not then be interpreted by the first circuit 22 as the clock enable component changing to a low state.

In order that the SysClkReq signal can function as both a clock enable signal and data carrier, the control logic 30 comprises means to enable the different components (clock enable and data components) of the SysClkReq signal 31 to be separated or distinguished. For example, in the illustrated embodiment, to separate the clock enable component and data component of the SysClkReq signal, a low-pass filtered 39 and non-filtered 40 version of the SysClkReq signal are used. To produce the low-pass filtered version 39, the SysClkReq signal 31 is first passed through a digital to analogue converter 38 and then through a low-pass filter 37. This process removes the high-rate fluctuations of the SysClkReq signal 31 during the data burst periods 52a, 52b. The data component of the SysClkReq signal 31 is thus filtered out, leaving the clock enable component. The resulting low-pass filtered signal 39 has an overall form that is similar to the clock enable signal 11 illustrated in FIG. 2, except that the rising and falling edges rise and fall more gradual in the filtered SysClkReq signal 39. The filtered SysClkReq signal 39 can then be used substantially in the same way as the clock enable Signal 11 shown in FIG. 2.

The delay, $\Delta T$ between the first rising edge of the SysClkReq signal 31 at time $T_0$ and the beginning of the first data burst period 52a at time $T_1$ provides time for the low pass filtered signal 39 to rise from the low state to the high state. Also, in this example the SysClkReq signal 31 is in a high state for at least half of every data burst period 52 (due to the inclusion of the padding periods 55). This means that the low-pass filtered signal 39 will remain substantially at the same level throughout the data burst period 52a, 52b, or will at least remain above the threshold level required for the signal to be regarded as being in a high state. If the padding periods 55 were not included then a sequence of substantially zero data bits may cause the low pass filtered signal to gradually decrease to a level corresponding to the low state if the data burst period 52a, 52b is sufficiently long. If the length of a continuous data burst period 52a, 52b is sufficiently short, then the padding periods may not be required since the data burst may terminate before the fluctuations in the signal during the data burst period had a chance to influence the filtered signal.

While a low-pass filtered version of the SysClkReq signal 39 is used as a clock enable signal, a non-filtered version of the SysClkReq signal 40 is used to extract the data encoded in the data burst periods 52a, 52b by reading the state of the signal during each data period 54 in the data burst periods 52a, 52b.

The clock enable component and the data component in the SysClkReq signal 31 may be separated or distinguished in other ways. For example, the distinguishing of the clock enable component and data component in the SysClkReq signal 31 may be performed entirely digitally, without requiring a low-pass filter or other analogue components. In one embodiment, when the SysClkReq signal 31 is used as a clock enable signal, digital processing circuitry comprised in the control logic 30 of the first ASIC 22 may be arranged to ignore the state of the SysClkReq signal 31 during the data periods 54. This is possible if the control logic is able to determine the beginning of a data burst period 52a (indicated, for example, by the first bit of the data burst) and has information relating to the timing of the data periods and padding periods (which may be predetermined or otherwise specified in advance). Conversely, when the SysClkReq signal 31 is used as a data transmitting signal, the control logic uses the state of the signal 31 within the data periods 54 to read the data. In one embodiment the SysClkReq signal 31 is successively delayed using a chain of D-flip-flop components. The resulting delayed data bits are then combined using OR logic gates. If one or more of the delayed data bits has a value of 1 then the first circuit 22 interprets this as the clock enable component being in a high state. As with analogue methods, when digital processing is used to distinguish the clock enable and data components of the SysClkReq signal 31, the presence of the padding periods 55 and/or the delay, ΔT 51, mentioned above, facilitates the process of separating or distinguishing these components.

Since the SysClkReq signal 31 is transmitted from the second ASIC 23 to the first ASIC 22 on a single line there is no need for additional pins on the first ASIC 22 to accommodate multiple transmission lines. Instead, a single signal transmitted on a single line provides duel function of a clock enable signal together with data transfer. Since the SysClkReq signal 31 functions as a clock enable signal, the embodiments described above are compatible with existing signalling techniques and protocols. Furthermore, the ability to also transmit data using the SysClkReq signal 31 enhances functionality. These advantages are realised with only small modifications of existing designs.

Thus, in some embodiments, it is advantageous for an RF ASIC to have information regarding which components of the system requested clocking signals, causing the sleep mode to be exited. This allows optimisation of power management by providing clocking signals only to those components which actually requested them. This may be achieved without requiring additional pins, or limited additional pins, Additional information may be communicated while supporting existing signalling techniques for back-compatibility.

The techniques of the present invention are not limited to the specific embodiments described above. For example, information other than, or in addition to, clocking information may be transmitted. A signal other than a clock enable signal may be used to transmit the serial data. The techniques described above may be used to transmit data between ASICs other than PM ASICs and RF ASICs. More generally, a signal used in a system having at least two states may be modulated to encode data into the signal. The two signal states may be used for example to cause enabling or disabling of one or more functions in the system, or to cause two respective functions to be performed. The signal is modulated to encode the data while the signal is being maintained in one of the states. The frequency at which the signal changes from one state to the other (for the purpose of causing enabling/disabling or performance of functions) will therefore be lower than the frequency of the encoded data. The modulation is performed such that the encoded data is distinguishable from the signal. Other modifications will readily occur to those skilled in the art.

The invention claimed is:

1. A first circuit operative to transmit information to a second circuit, the first circuit comprising:
    a signal generator operative to generate and transmit a signal to the second circuit, the first circuit being operative to place the signal in a first state operative to cause the second circuit to perform a first operation or in a second state operative to cause the second circuit to perform a second operation comprising providing one or more clocking signals to components of a system; and
    a modulator in the signal generator operative to, when the generated signal is in the second state, modulate the generated signal during a data burst period to encode data into the generated signal, the data identifying which of said components of the system are requesting clocking signals, the data burst period occurring within a period in which the generated signal is in the second state, the signal being modulated such that the encoded data is distinguishable from the generated signal.

2. The circuit of claim 1 wherein the data burst period comprises a plurality of data periods during which the state of the signal is representative of data encoded in the signal.

3. The circuit of claim 2 wherein the data periods are separated by padding periods during which the signal is in the second state.

4. The circuit of claim 3 wherein each padding period is at least as large as the duration of each data period.

5. The circuit of claim 2 wherein the signal is in the first state during the first data period.

6. The circuit of claim 2 wherein the data burst period comprises a predetermined number of data periods.

7. The circuit of claim 6 wherein the state of the signal during the last data period is indicative of whether a further data burst period will follow a current data burst period.

8. The circuit of claim 1 wherein the data burst period is initiated following a delay after the signal changes from being in the first state to being in the second state.

9. The circuit of claim 1 wherein the signal is modulated such that the time-averaged level of the modulated signal, when the generated signal is in the second state, is greater than a threshold.

10. The circuit of claim 1 wherein the first operation of the second circuit is restricting the generation of clocking signals by the second circuit and the second operation of the second circuit is providing one or more clocking signals by the second circuit.

11. The circuit of claim 10 wherein the data encoded into the signal includes data identifying one or more components of the system that are requesting clocking signals.

12. The circuit of claim 1 wherein the system is a wireless cellular system.

13. A system comprising a first circuit, a second circuit, and components, in which signaling information is communicated between the first circuit and the second circuit, comprising:
    a first circuit comprising a signal generator operative to generate and transmit a signal to the second circuit, the first circuit being operative to place the signal in a first state operative to cause the second circuit to perform a first operation or in a second state operative to cause the second circuit to perform a second operation comprising providing one or more clocking signals to components of a system; wherein the signal generator includes a modulator operative to, when the generated signal is in the second state, modulate the generated signal during a data burst period to encode data into the generated signal, the data identifying which of said components of the system are requesting clocking signals, the data burst period occurring within a period in which the generated signal is in the second state, the signal being modulated such that the encoded data is distinguishable from the generated signal; and a second circuit comprising an input to receive the signal generated by the first circuit, and outputs operative to provide clocking signals to the components.

14. The system of claim 13 wherein the second circuit comprises one or more circuits operative to separate the encoded data from the signal.

15. The system of claim 14 wherein the circuit operative to separate the encoded data from the signal comprises one or more of a low pass filter and a digital processing circuit.

16. A first circuit operative to transmit information to a second circuit, the first circuit comprising:

a signal generator operative to generate and transmit a signal to the second circuit, the first circuit being operative to place the signal in a first state operative to cause the second circuit to perform a first operation comprising restricting the generation of clocking signals by the second circuit, or in a second state operative to cause the second circuit to perform a second operation comprising providing one or more clocking signals by the second circuit; and a modulator in the signal generator operative to, when the generated signal is in the second state, modulate the generated signal during a data burst period to encode into the generated signal data identifying which components of the system are requesting clocking signals, the data burst period occurring within a period in which the generated signal is in the second state, the signal being modulated such that the encoded data is distinguishable from the generated signal.

* * * * *